US010614728B2

(12) United States Patent
Willingham et al.

(10) Patent No.: US 10,614,728 B2
(45) Date of Patent: *Apr. 7, 2020

(54) SCORING SERVER

(71) Applicant: TELECOMMUNICATION SYSTEMS, INC., Annapolis, MD (US)

(72) Inventors: Jeremy Willingham, Annapolis, MD (US); Brendan Watters, Silver Spring, MD (US); Anthony Hendricks, Pensacola, FL (US); Brian Reider, Pasadena, MD (US); Rob Odom, Serverna Park, MD (US); Robert Ledesma, College Park, MD (US)

(73) Assignee: TELECOMMUNICATION SYSTEMS, INC., Annapolis, MD (US)

( * ) Notice: Subject to any disclaimer, the term of this patent is extended or adjusted under 35 U.S.C. 154(b) by 624 days.

This patent is subject to a terminal disclaimer.

(21) Appl. No.: 15/391,307

(22) Filed: Dec. 27, 2016

(65) Prior Publication Data

US 2017/0169724 A1    Jun. 15, 2017

Related U.S. Application Data

(63) Continuation of application No. 14/221,908, filed on Mar. 21, 2014, now Pat. No. 9,548,000.

(60) Provisional application No. 61/829,708, filed on May 31, 2013, provisional application No. 61/803,986, filed on Mar. 21, 2013.

(51) Int. Cl.
*G09B 19/00* (2006.01)

(52) U.S. Cl.
CPC .............. *G09B 19/0053* (2013.01)

(58) Field of Classification Search
CPC .................. G09B 19/00; G09B 19/0053
USPC ............................................. 434/118
See application file for complete search history.

(56) References Cited

U.S. PATENT DOCUMENTS

| 6,691,146 | B1 | 2/2004 | Armstrong et al. |
| 7,934,222 | B2 | 4/2011 | Anderson et al. |
| 8,250,654 | B1 * | 8/2012 | Kennedy ............... H04L 41/22 |
| | | | 713/187 |

(Continued)

FOREIGN PATENT DOCUMENTS

EP    2 365 675 A1    9/2011

*Primary Examiner* — Thomas J Hong
(74) *Attorney, Agent, or Firm* — Tarolli, Sundheim, Covell & Tummino LLP

(57) ABSTRACT

A scoring server for assessing technical skills in a practical environment. A client application acts as a middle man between a terminal and an operating system to capture and forward all input from and output to students to the scoring server. The scoring server compares recorded student activity against a list of tasks deemed capable of accomplishing course objectives assigned to students. As objectives are met by a student, the students' grade is updated in real-time. Each student passes or fails an exam based on tasks performed and skills employed. The client application exists for two operating system types: WINDOWS® and LINUX®. A LINUX® client employs a pseudoterminal to permit access to terminal input/output and communication through stdin, stdout, and stderr channels. A windows client (WC) comprises a WC command line activity logger and a WC monitor process to intercept all communication through stdin, stdout, and stderr communication channels.

13 Claims, 11 Drawing Sheets

(56) References Cited

U.S. PATENT DOCUMENTS

2008/0313309 A1\* 12/2008 Banerjee ................ H04L 67/14
  709/219
2009/0208910 A1\* 8/2009 Brueckner ............... G09B 5/00
  434/11

\* cited by examiner

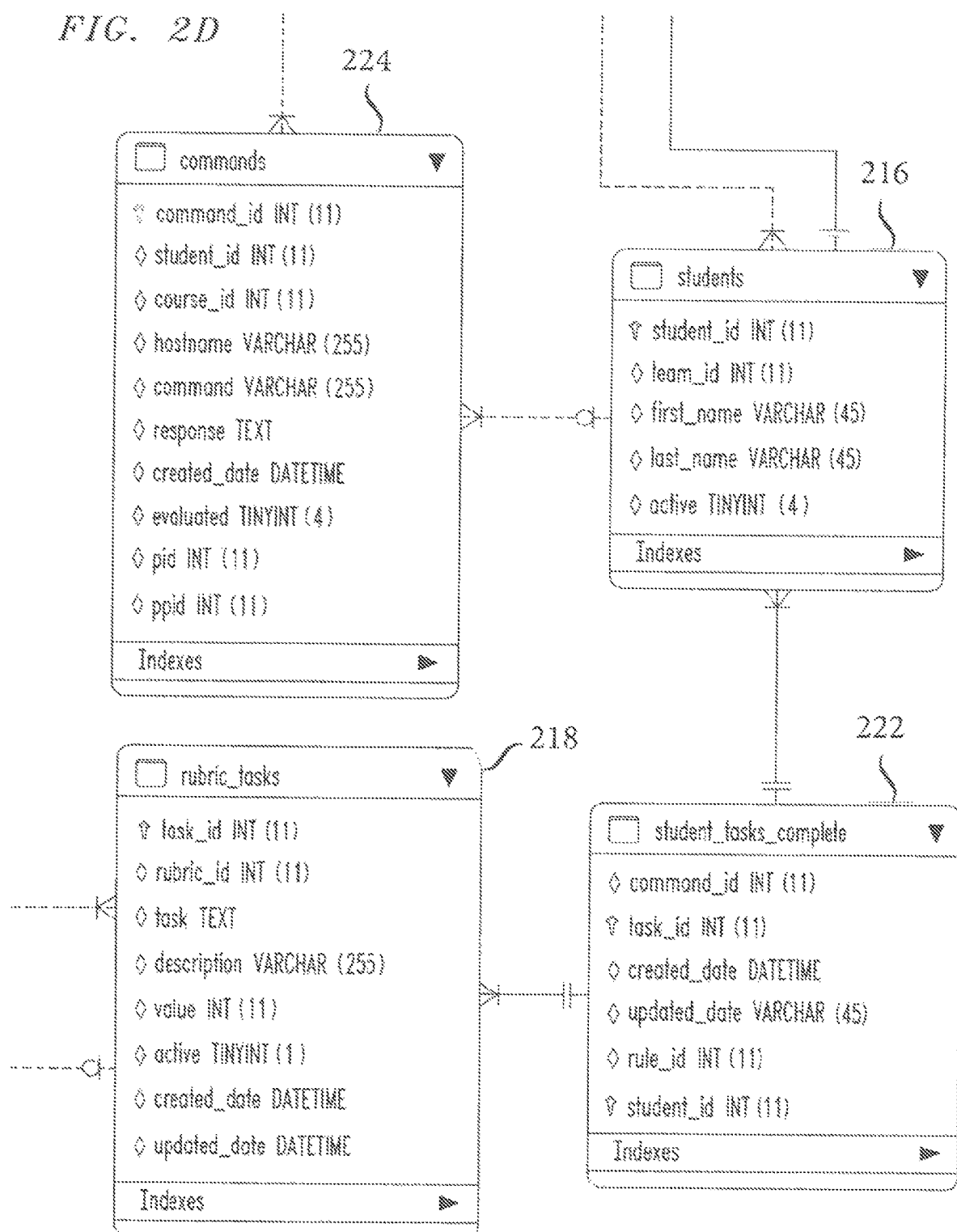

```
host server ~ 700 cmd.exe ~ 720a
c:\> ipconfig

Windows IP Configuration

Wireless LAN adapter Wirel

Media State . . . . . . . . . . :
    Connection-specific DNS

Ethernet adapter Bluetooth

Media State . . . . . . . . . . :
    Connection-specific DNS c:\> cd Windows
c:\Windows> dir
. . .
```

```
                                    ~ 710b cmd.exe ~ 720b
C:\Users\blah>netstat Active Connections Proto  Local Address
 TCP    10.0.99.117:54831
 TCP    10.0.99.117:54921
 TCP    10.0.99.117:56090
 TCP    10.0.99.117:57424
 TCP    10.0.99.117:57428
 TCP    10.0.99.117:57440
 TCP    10.0.99.117:60116
 TCP    10.0.99.117:61967
 TCP    10.0.99.117:64314
 TCP    10.0.99.117:64316
 TCP    127.0.0.1:443
 TCP    127.0.0.1:443
 TCP    127.0.0.1:57417
 TCP    [::1]:57431
C:\Users\student> dir
. . .
```

```
                                    ~ 710c cmd.exe ~ 720c
d:\tools > ping www.yahoo.com Pinging ds-any-fp3-real.wa
98.139.183.24:
Reply from 98.139.183.24:
Reply from 98.139.183.24:
Reply from 98.139.183.24:
Reply from 98.139.183.24:

Ping statistics for 98.139
    Packets: Sent = 4, Rec
Approximate round trip time
    Minimum = 251ms, Maximum d:\tools>dir
Volume in drive C has no
Volume Serial Number is
```

FIG. 7

SCORING SERVER

The present invention claims priority from U.S. Provisional No. 61/829,708, filed May 31, 2013, entitled "Scoring Server"; and from U.S. Provisional No. 61/803,986, filed Mar. 21, 2013, entitled "Scorebot", the entirety of both of which are expressly incorporated herein by reference.

BACKGROUND OF THE INVENTION

1. Field of the Invention

This invention relates generally to telecommunications, and more particularly to cyber security and operations training.

2. Background of Related Art

Unlike typical academic training, a large part of cyber security and operations training involves practical application of concepts and techniques. However, there currently exists no recognized mechanism for assessing student technical skills in a practical environment. Consequently, most technical training courses administer knowledge exams to evaluate student skill sets.

Most attempts to assess student skills in a practical application environment center around Capture the Flag (CTF) competitions. A conventional Capture the Flag (CTF) competition tracks activity of persons (or teams) attempting a given objective against other persons (or teams) attempting the same objective. For example, if a goal of a Capture The Flag (CTF) competition is to maintain an active web server, the Capture The Flag (CTF) system periodically checks to ensure student web servers are functional. Competing students/teams may attempt to bring other students'/teams' web servers down to prevent those students/teams from earning points. If a students'/teams' web server is brought down, it is up to that student/team to get their service up and running again.

Unfortunately, Capture the Flag (CTF) competitions do not include skill evaluation capabilities. For instance, Cyber-NEXS is an exemplary Capture the Flag (CTF) product (commercially manufactured by SAIC) devoid of training/skill evaluation capabilities. Hence, in a Capture the Flag (CTF) competition with a goal of maintaining an active web server, the Capture the Flag (CTF) system only checks to ensure web servers are running. The Capture the Flag (CTF) system has no way of assessing how quickly a problem is identified or how efficiently a problem is solved.

While Capture the Flag (CTF) competitions are fun, they do not identify strengths and weaknesses of students, nor do they assess skills toward a standard. The training industry is in dire need of a mechanism that can assess actual skills in a practical environment.

SUMMARY OF THE INVENTION

A method and apparatus for assessing technical skills in a practical environment comprises a scoring server (aka a PerformanScore).

In accordance with the principles of the present invention, a client application acts as a middle man between a terminal and an operating system to successfully capture all input from and output to a student undergoing evaluation in a practical training environment. The client application then transmits all recorded student activity to the scoring server, which uses the recorded student activity to assess student technical skills in a practical environment.

In accordance with the principles of the present invention, each student undergoing evaluation in a practical training environment is assigned one or more course objectives. To assess a student's performance, the scoring server compares all activity recorded for the student against a list of tasks capable of accomplishing course objectives assigned to the student. If a command performed by a student meets a task deemed capable of accomplishing an objective assigned to that student, the objective is marked as complete. As objectives are met by students, grades are updated in real-time.

When a student completes a practical exam, the scoring server generates a report for the student that outlines all objectives met, all objectives missed, and a comprehensive final score. Students either pass or fail exams based on tasks performed and skills employed, as opposed to simply knowledge memorized.

In accordance with the principles of the present invention, client applications exist for two operating system types: windows and LINUX. A windows client (WC) application comprises two individual components: a windows client (WC) command line activity (CLA) logger and a windows client (WC) monitor process. The windows client (WC) intercepts all communication through standard in, standard out, and standard error communication channels of machines used to evaluate student performance.

Alternatively, a LINUX client application comprises a pseudoterminal to permit access to terminal input/output and communication through standard in, standard out, and standard error channels of machines used to evaluate student performance. Moreover, the inventive LINUX client implements a well-known system-hooking tactic (libhook.so) to ascertain commands executed on machines and transparently retrieves command responses by creating a second pseudoterminal and linking the second pseudoterminal to a primary user terminal.

To attribute commands issued on target machines in a practical training environment to individual students, a windows/LINUX client application sends all commands issued on target machines to the scoring server, along with a command process ID, a timestamp, host name, network statistics (netstat), and a process list associated with the machine the command was executed on. Using information received in a netstat and process list, the scoring server back traces to find an originating IP address for a command, and then matches the IP address to a student ID.

BRIEF DESCRIPTION OF THE DRAWINGS

Features and advantages of the present invention will become apparent to those skilled in the art from the following description with reference to the drawings, in which:

FIG. 2A, FIG. 2B, FIG. 2C and FIG. 2D together shows a schema of an exemplary scoring server, in accordance with the principles of the present invention.

FIG. 7 shows an exemplary single host (windows client), in accordance with the principles of the present invention.

DETAILED DESCRIPTION OF ILLUSTRATIVE EMBODIMENTS

The present invention provides a scoring server (aka a PerformanScore) to assess student technical skills in a practical environment.

In accordance with the principles of the present invention, the inventive scoring server assesses student activity performed in a practical training environment against objectives related to student training.

Currently, there exists no mechanism capable of assessing student technical skills in a practical environment. For instance, in an exemplary course in penetration testing, students are required to perform the following tasks: conduct an external reconnaissance of a network, port scan the network to find operational hosts, identify applications running on hosts, identify vulnerabilities within applications, exploit application vulnerabilities to gain access to hosts, and conduct a reconnaissance of the system and internal network to identify important information. Unfortunately, traditional training courses are incapable of grading a student's ability to do such tasks and instead simply test students' knowledge of such tasks. Traditional training courses thus promote data memorization and do not necessarily produce students capable of performing job functions.

The present invention scores students not only based on what they know, but also based on what they do.

Figure 1:
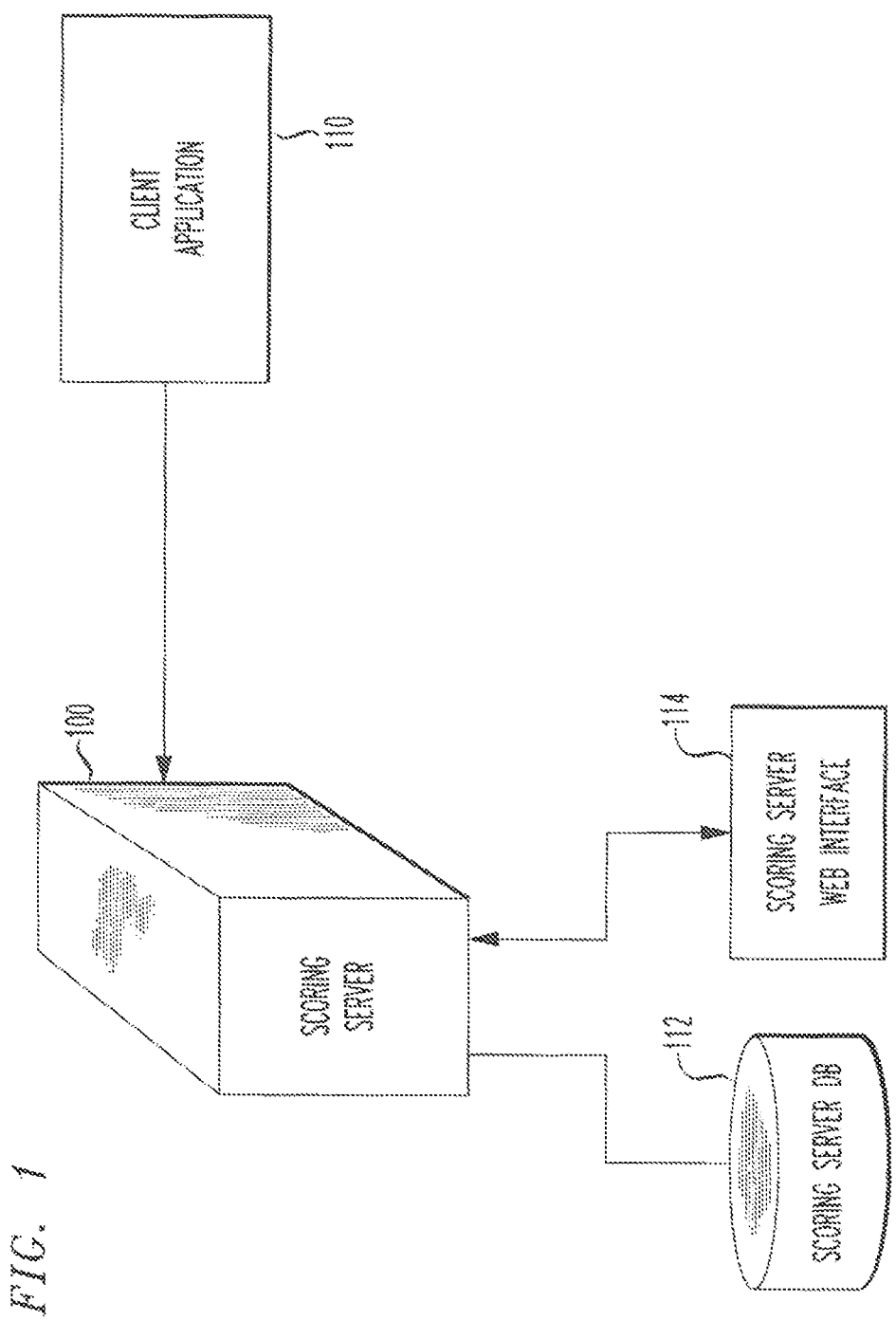
FIG. 1 depicts an exemplary scoring server network structure, in accordance with the principles of the present invention.

FIG. 1 depicts an exemplary scoring server network structure, in accordance with the principles of the present invention.

In accordance with the principles of the present invention, the inventive scoring server 100 utilizes a client application 110 to capture all student activity performed during practical application exercises and exams. The client application 110 acts as a middleman between a terminal and an operating system to successfully capture all input from and output to a student. The inventive client application 110 then sends all recorded student activity to the scoring server 100 (located elsewhere on a system/network) and the scoring server 100 uses recorded student activity to assess student performance. For example, a client application 110 captures all commands (e.g. commands to initiate a port scan of a network) performed by a student in a practical training environment and passes recorded commands and relevant command information (e.g., command, student, host, etc.) to the scoring server 100. The scoring server 100 then uses the recorded commands and relevant command information to evaluate the student's performance.

The inventive scoring server (aka PerformanScore) 100 preferably comprises an apache web server with PHP and a MySql scoring server database 112 to store and maintain student data, course data, and recorded student activity.

Course and student information is preferably uploaded to the scoring server 100 via a scoring server web interface 114, as depicted in FIG. 1. In particular, the following course information is preferably stored in the scoring server 100: course name, course description, associated rubric(s). Moreover, the following student information is preferably stored in the scoring server 100: first name, last name, IP addresses, assigned team, commands issued on machines.

Figure 2A:
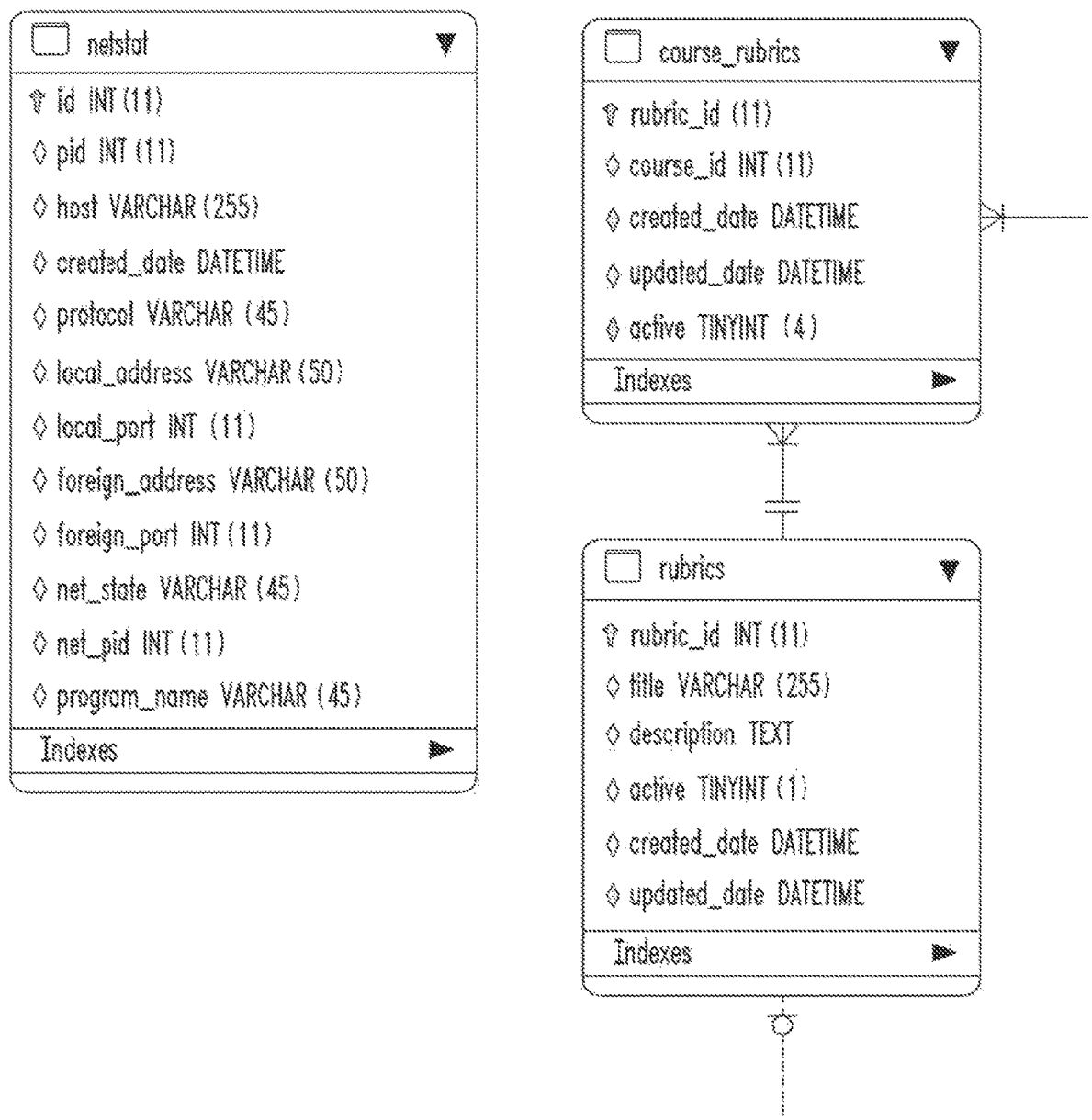
Figure 2B:
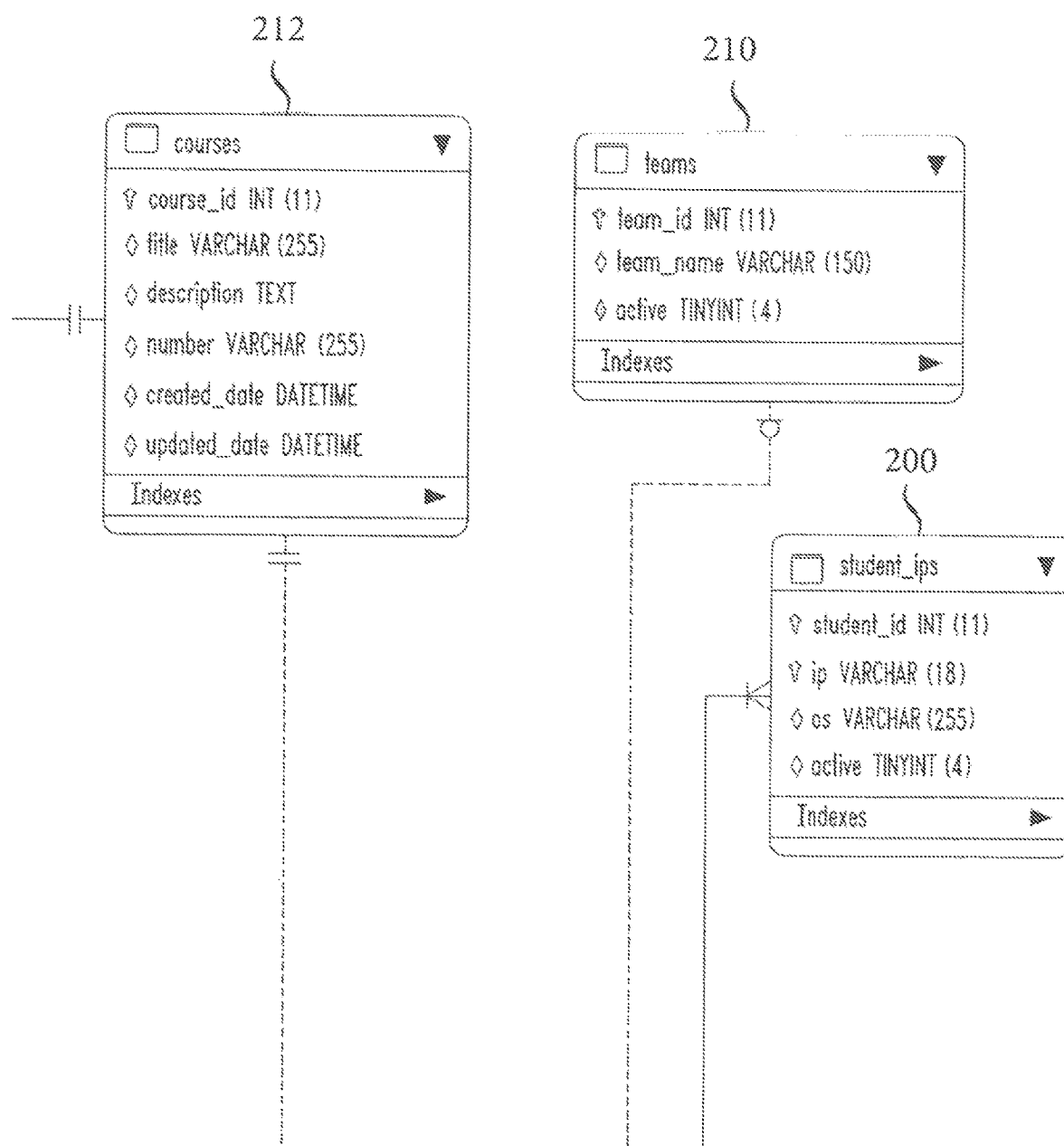
Figure 2C:
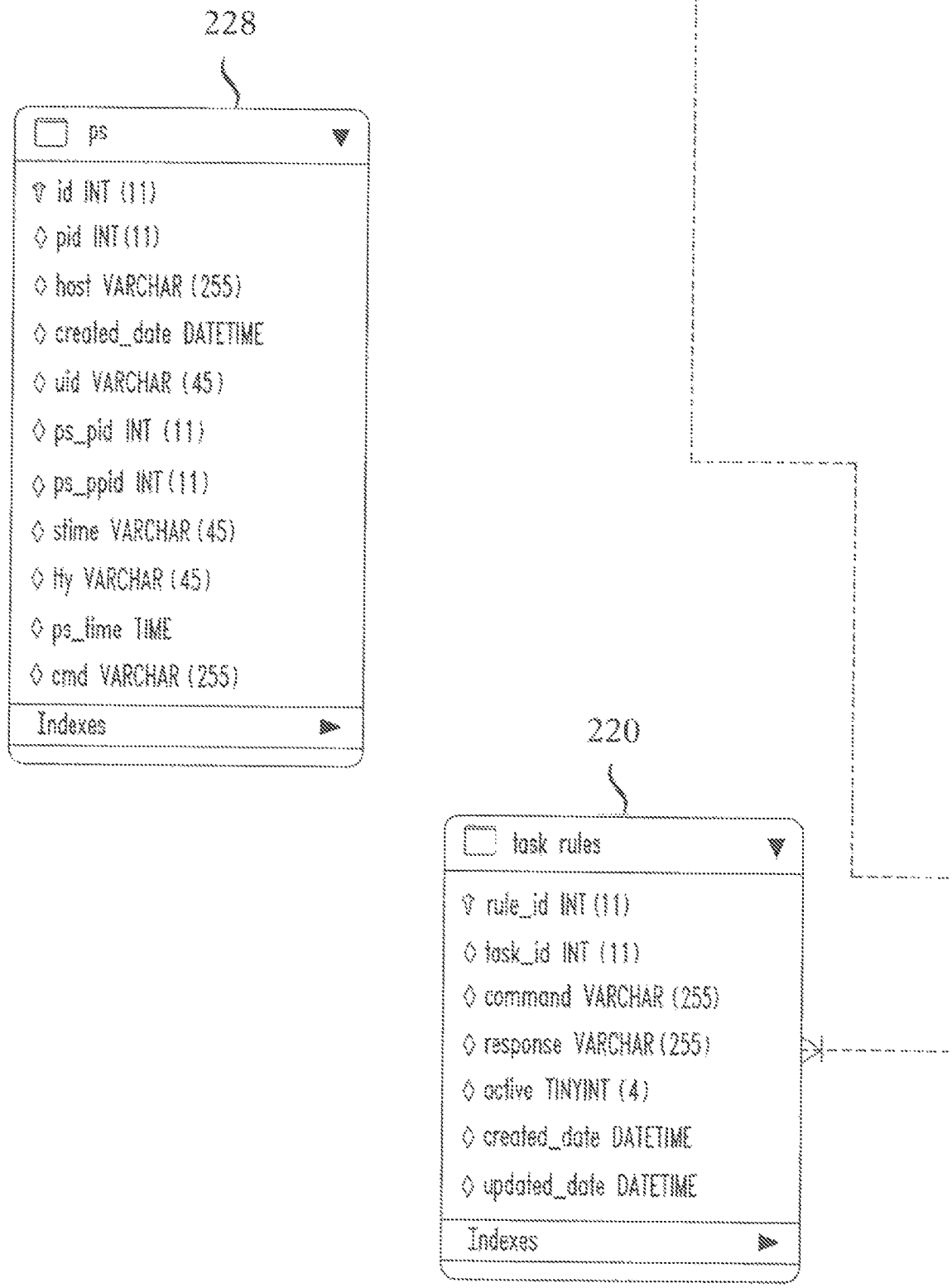

FIG. 2 shows an exemplary database schema for a scoring server, in accordance with the principles of the present invention.

In particular, as portrayed in FIG. 2, students are preferably assigned IP addresses 200 of machines and/or virtual machines they will be using during performance evaluation, to enable student commands 224 to be linked back to IP addresses 200. Students can also be assigned to teams 210, for which evaluation and scoring may be performed on a team or student basis. Student records are preferably organized in the scoring server database 112 according to course 212.

Each course 212 in the inventive scoring server 100 system has an associated rubric 214 for scoring and grading students 216. A course rubric 214 preferably details specific objectives 218 students 216 are expected to complete and each objective 218 is assigned a point value used to determine a student's 216 score. Each objective 218 additionally includes a task list 220, which comprises tasks deemed capable of achieving that objective 218. Tasks 220 are entered as a regular expression.

In accordance with the principles of the present invention, to assess a student's performance during a practical exam/training exercise, the scoring server 100 compares actions performed by the student (and recorded by a client application 110) against a list of tasks 220 deemed capable of accomplishing course objectives 218 assigned to that student (a list of tasks 220 is utilized to account for the many different ways in which a particular assignment may be accomplished). If a command 224 performed by a student meets a task 220 deemed capable of accomplishing one or more course objectives 218 assigned to that student (e.g., correct IP range, options, etc.), the scoring server 100 marks the objective(s) 218 as complete 222 and the student's grade is updated in real-time. It is possible for a student to complete multiple objectives 218 with one command 224 as long as the command 224 matches a task listed in each objective's 218 task list 220. For each objective 218: sections, modules, or content associated with the objective 118 can be uploaded to the scoring server 100 to aid student remediation.

A course administrator can review all commands 224 executed by students 216 via a scoring server web interface 114. If at any time an administrator feels that a command 224 that failed to deem an objective 218 complete does in fact complete the objective 218, the administrator can mark the objective 218 as complete 222 and list the command 224 in a task list 220 associated with the objective 118.

The scoring server web interface 114 also provides a course administrator the ability to view the commands executed by the students in realtime.

When a student completes a practical exam/exercise, the scoring server 100 generates a report for the student that outlines all objectives 118 met 222, all objectives 118 missed, and a comprehensive final score.

The inventive scoring server 100 additionally compiles command reports per class, student, and team. Commands in a command report are listed in chronological order and each command identifies a host machine on which the command was executed and initiated. A command report for a student/team also displays a comprehensive final score compiled for that student/team. A team command report depicts which students on a team completed which tasks. A report may also be generated to show what parts of training a student should review based on course objectives left incomplete.

Students either pass or fail exams based on tasks they performed and skills they employed, rather than simply knowledge they memorized.

In accordance with the principles of the present invention, client applications 110 exist for two operating system types: windows and LINUX. The windows client application intercepts communication on standard in, standard error, and standard out channels of machines used in a practical training environment. The windows client application forwards all data flowing from a student to a system and all data flowing from a system to a student to the scoring server 100 via a secure communications channel.

In addition to standard in, standard error, and standard out communication channels, LINUX machines occasionally use added channels of communication. These added channels unfortunately negate the effectiveness of a simple standard in, standard out, and standard error communication capture.

Thus, to implement a client application 110 in a LINUX or UNIX setting, the present invention employs a pseudoterminal. A pseudoterminal for a LINUX client allows communication through standard in, standard error, and standard out channels of machines used in a practical training environment, and additionally permits access to terminal input/output. Terminal input/output is used to pass terminal codes and secure terminal-to-terminal communication (typically passwords). In accordance with the principles of the present invention, the LINUX client forwards all data flowing from a student to a system and all data flowing from a system to a student to the scoring server 100 via a secure communications channel. Both LINUX and windows client applications 110 send commands, responses, and other information relevant to performance evaluation to the scoring server 100 via a POST request.

In accordance with the principles of the present invention, the scoring server 100 stores commands and responses executed on multiple machines in a practical training environment, each machine running a client application 110 (e.g., a windows/LINUX client application). To attribute commands issued on target machines to individual students, a windows/LINUX client application 110 sends all commands issued on target machines to the scoring server 100, along with a command process ID, a timestamp, host name, network statistics (netstat), and a process list (ps) associated with the machine the command was executed on. Netstat information includes local IP addresses and ports, foreign IP addresses and ports, and process IDs. A process list (ps) contains process IDs and parent process IDs.

Upon receipt of a command and relevant command information, the scoring server 100 saves the command, command process ID, command parent process ID, host name, and time stamp to a commands table 224 in the scoring server database 112 and then saves netstat and process list (ps) information in an appropriate manner.

In particular, each line of a netstat is stored as an individual record in a netstat table 226 (see the database schema displayed in FIGS. 2A, 2B, 2C and 2D). Being that a netstat sent to the scoring server 100 by a client application 110 is a uniform resource locator (URL) encoded string, the scoring server 100 first decodes the string, and then parses the decoded string by row. The scoring server 100 parses data maintained in each row of a netstat into proper columns and then writes the information to a database 112. To link associated netstat rows together, the server 100 writes an associated command process ID, host name, and timestamp on each row. The scoring server 100 stores the process list using the same process (in a process list (ps) table 228.

Using information received in a netstat and process list (ps), the scoring server 100 back traces to find an originating IP address for a command, and then matches the IP address to a student ID (see CLA attribution/initiation in windows-client.odt). The scoring server 100 then updates the command record 224 with the student ID to attribute the command to the student. In particular, the client application 110 preferably sends a response and attaches an original command process ID, host name, and timestamp associated with the command to the response. The response is then used to update the command record 224 with student information.

Figure 3:
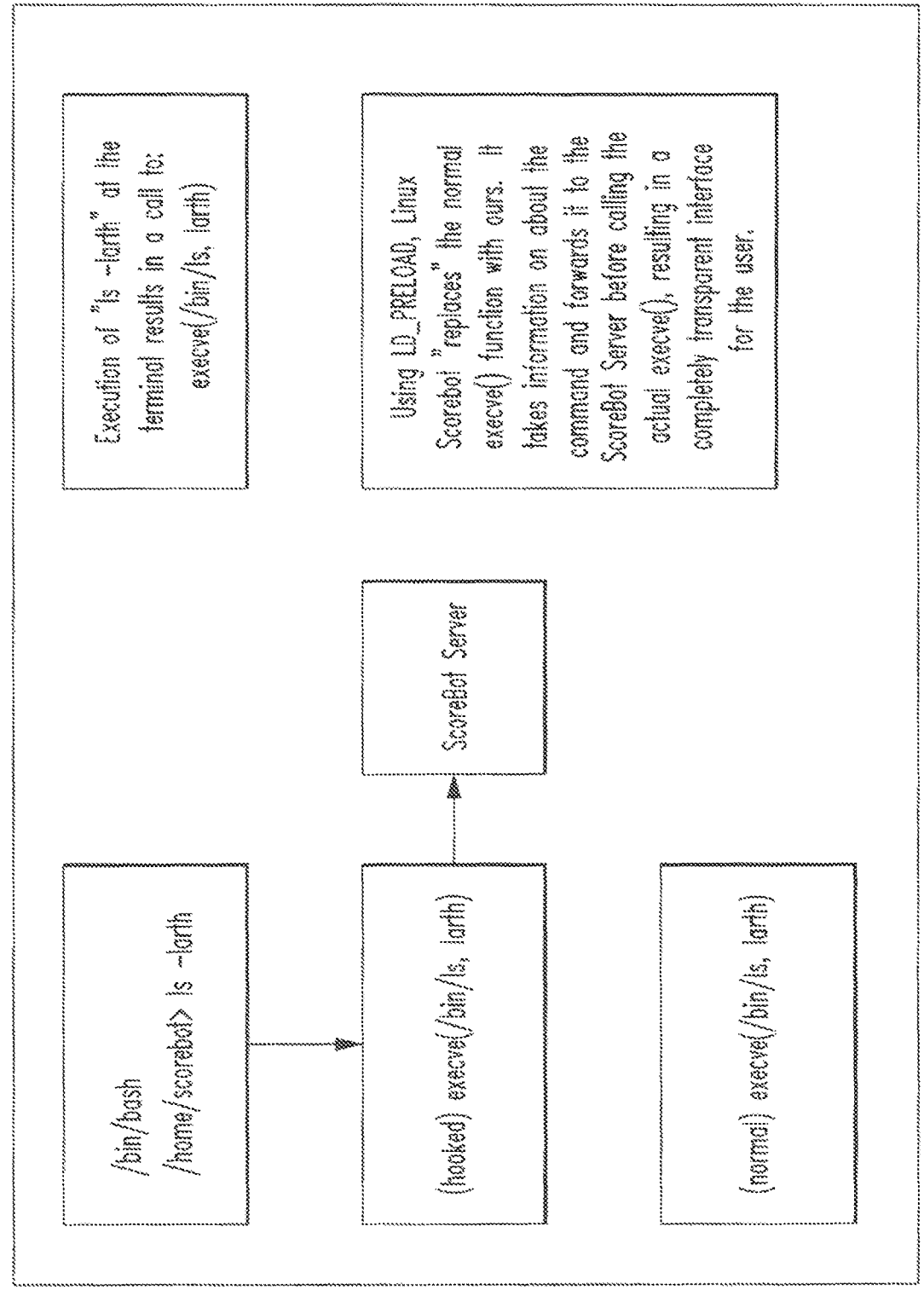
FIGS. 3 and 4 show an exemplary LINUX client application of a scoring server, in accordance with the principles of the present invention.
Figure 4:
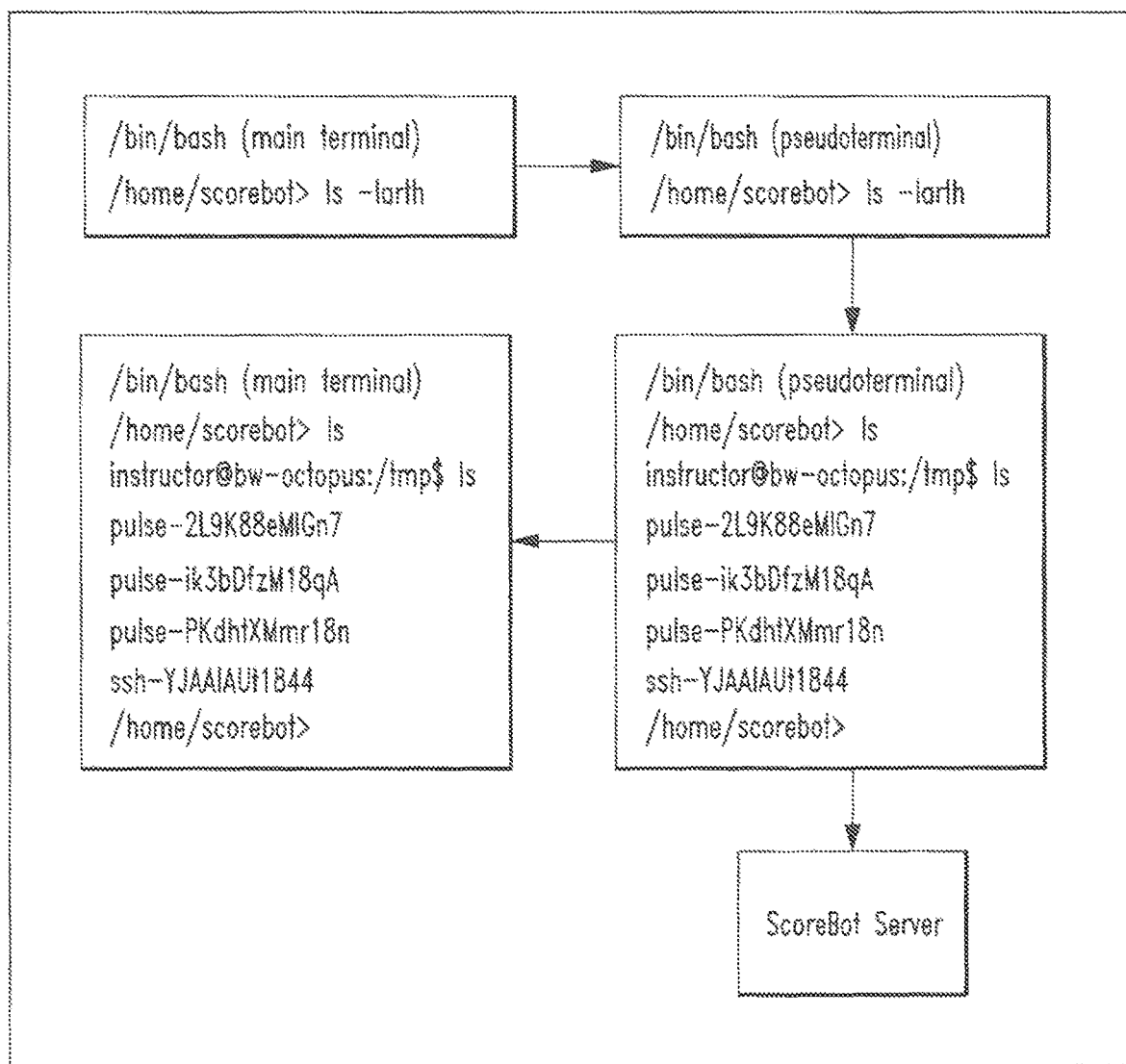

FIGS. 3 and 4 show an exemplary LINUX client application for a scoring server, in accordance with the principles of the present invention.

Figure 5:
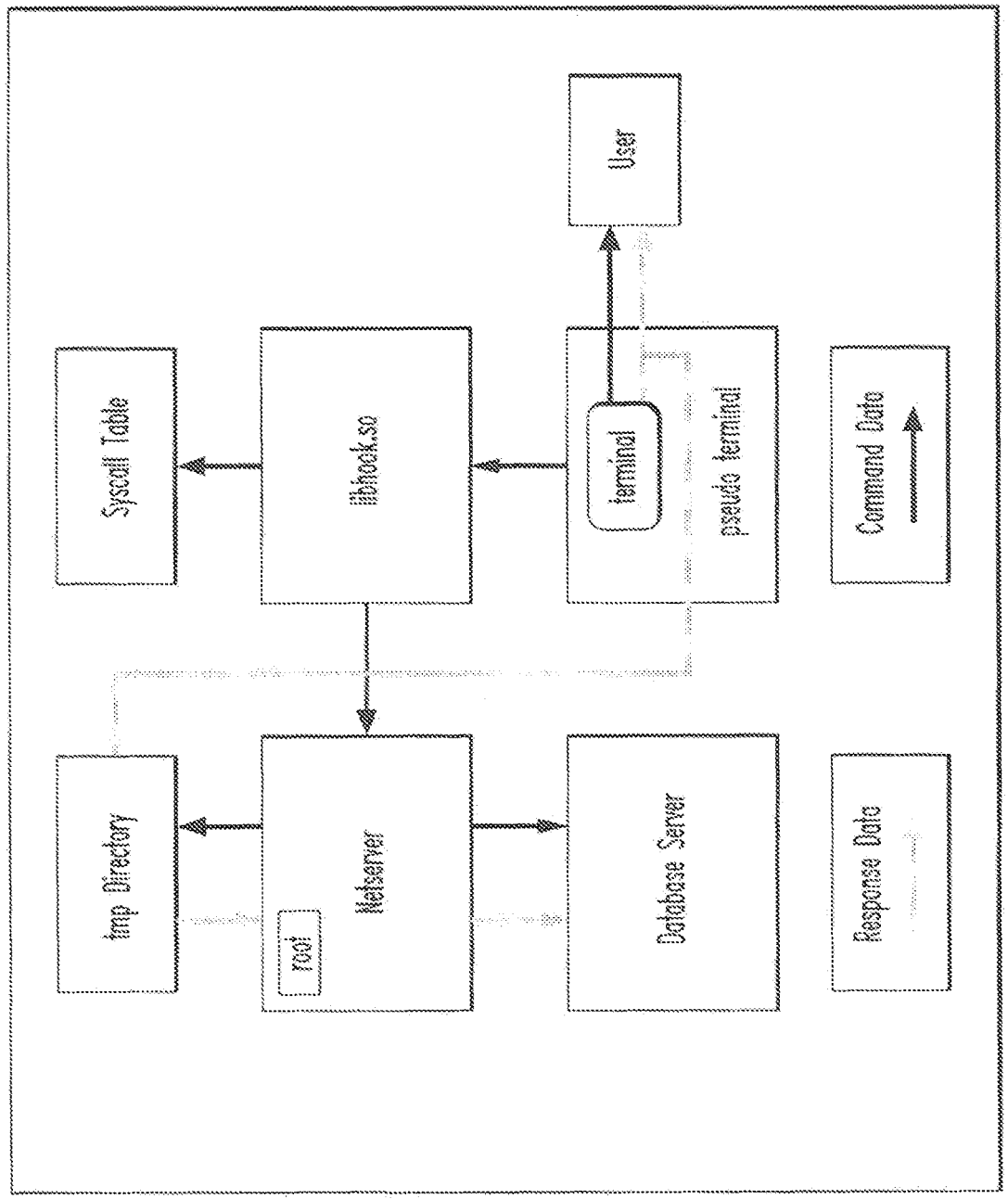
FIG. 5 shows exemplary scoring server data flow for a LINUX Client, in accordance with the principles of the present invention.

FIG. 5 shows exemplary scoring server data flow for a LINUX client, in accordance with the principles of the present invention.

In particular, as depicted in FIGS. 3-5, the purpose of a scoring server 100 LINUX client is to provide the scoring server 100 with local command line activity (CLA) and to permit the scoring server 100 to attribute local activity to a remote student.

The scoring server 100 LINUX client utilizes multiple approaches that work in tandem to identify commands executed on a machine in a practical training environment, computer responses, and who executed what.

In particular, to ascertain commands executed on a machine, the inventive LINUX client implements a well-known system-hooking tactic (libhook.so) that places the client between a user and an operating system kernel. Using an LD_PRELOAD hooking technique targeting an execve system call, the LINUX client intercepts any attempt to start a new executable file (the only way to launch a program legitimately in UNIX). The placement of the client application 110 within the present invention allows interception of any command issued in a hooked terminal. The hooking approach can easily be expanded to intercept all actions, including actions performed via a graphical user interface (GUI).

To transparently retrieve command responses, the inventive LINUX client creates a second pseudoterminal and links the second pseudoterminal to a primary user terminal. The terminal connection allows the LINUX client to intercept all communication to and from a student's terminal. The terminal connection is also able to ascertain commands executed on a machine. However, the hooked system call method provides greater information, better attribution, and is scalable for future use within a graphical user interface (GUI).

Moreover, to attribute commands to individual students, the LINUX client sends process and network information relevant to each command to the inventive scoring server 100. Since certain network and process information is privileged, this component runs as a service in the background. This service additionally functions as a communications hub to coordinate communication between LINUX client application components and the scoring server 100.

In accordance with the principles of the present invention, when a student enters a command at a scoring server 100 prompt, keystrokes pass transparently to the secondary pseudoterminal of the LINUX client. The pseudoterminal subsequently calls execve( ) providing the location of the binary to run, as well as any argument values specified by the student. The modified hooked call is then implemented, which takes and forwards data for execve( ) to the local administrative service server before handing the data to the actual execve( ) system call. The administrative service then immediately sends data relevant to the command to the scoring server 100, as it does not know when the command is going to end. The results of the binary come back to the pseudoterminal, and the pseudoterminal forwards the response data to the administrative service before passing the response data back to the main terminal seen by the user. The administrative service keeps reading data from the pseudoterminal until a notification for a new command is received, at which point the administrative service sends all response data for the previous command to the scoring server 100.

The inventive approach has evolved to include multiple release candidates. Some failed attempts at LINUX clients include:

1) A simple redirection pipe that allows the LINUX client to grab all data coming into a terminal on a standard input channel and all data leaving the terminal on a standard output channel. While this approach does meet many requirements, it fails for the following reasons:
   i. Data appears in a stream so that it is difficult to determine when a command starts and stops.
   ii. UNIX implements a security feature that prevents interception of passwords at a terminal prompt. This security feature bypasses the standard input channel and uses a console-specific connection to send passwords to commands like sudo and ssh. The simple redirection pipe fails to overcome the UNIX security feature, and is thus unable to forward passwords to commands requiring authentication.

2) A single executable pseudoterminal that intercepts commands and responses and forwards them to the scoring server. This implementation fails because the pseudoterminal has trouble separating command response starts and stops and assumes a new command is launched every time a user selects an enter key (an assumption that is unreliable an prone to abuse).

3) A hooked library and a pseudoterminal (the first two components of the current solution). This implementation fails for the following reasons:
   i. Command terminals used by students are not always root. The implementation fails to• get process and network data and cannot always open a communications channel to the scoring server.
   ii. Even when functioning properly, the implementation does not support multiple terminal windows for students.

The current implementation of a LINUX client application supports communication and is capable of retrieving machine status, command, and response data from multiple users and multiple terminal windows. The inventive LINUX client tracks windows independently and allows any number of students to work on the same machine. The inventive LINUX client also reports all necessary information to the scoring server 100 to permit successful differentiation of commands.

Command line activity (CLA) is a conventional term that refers to user-initiated activity executed through a command line or shell. For example, starting a command line (cmd.exe) and running ipconfig.exe constitutes command line activity (CLA). Moreover, TelNet-ing into remote host, server.remotehost.com, and running ipconfig.exe constitutes command line activity (CLA) initiated from a user machine and executed on a remote machine (server.remotehost.com). This combines direct user input with effects and accomplishments.

In accordance with the principles of the present invention, the inventive windows client (WC) comprises two individual components: a windows client (WC) command line activity (CLA) logger and a windows client (WC) monitor process.

The windows client (WC) command line activity (CLA) logger is responsible for recording streams of command line activity (CLA) executed on a windows machine and is not responsible for breaking up streams into individual commands. The windows client (WC) monitor process asynchronously consumes output from the windows client (WC) command line activity (CLA) logger as new process events are triggered.

The present invention aims to make windows client (WC) command line activity (CLA) logger actions completely transparent to users. All disclosed embodiments involve instrumenting cmd.exe. The windows client (WC) does not catch command line activity (CLA) streams on any other shells (e.g. cygwin).

The inventive windows client (WC) is not a keystroke logger. A keystroke logger (KS) logs all keys that have been typed by a user onto a keyboard physically attached to a machine (e.g. stu1) and is only capable of identifying machines on which sessions have been initiated, not machines on which command line activity (CLA) is executed. However, it is essential to know what machine command line activity (CLA) is initiated on and what machine command line activity (CLA) is executed on to determine what students/users run what commands on what hosts.

Figure 6:
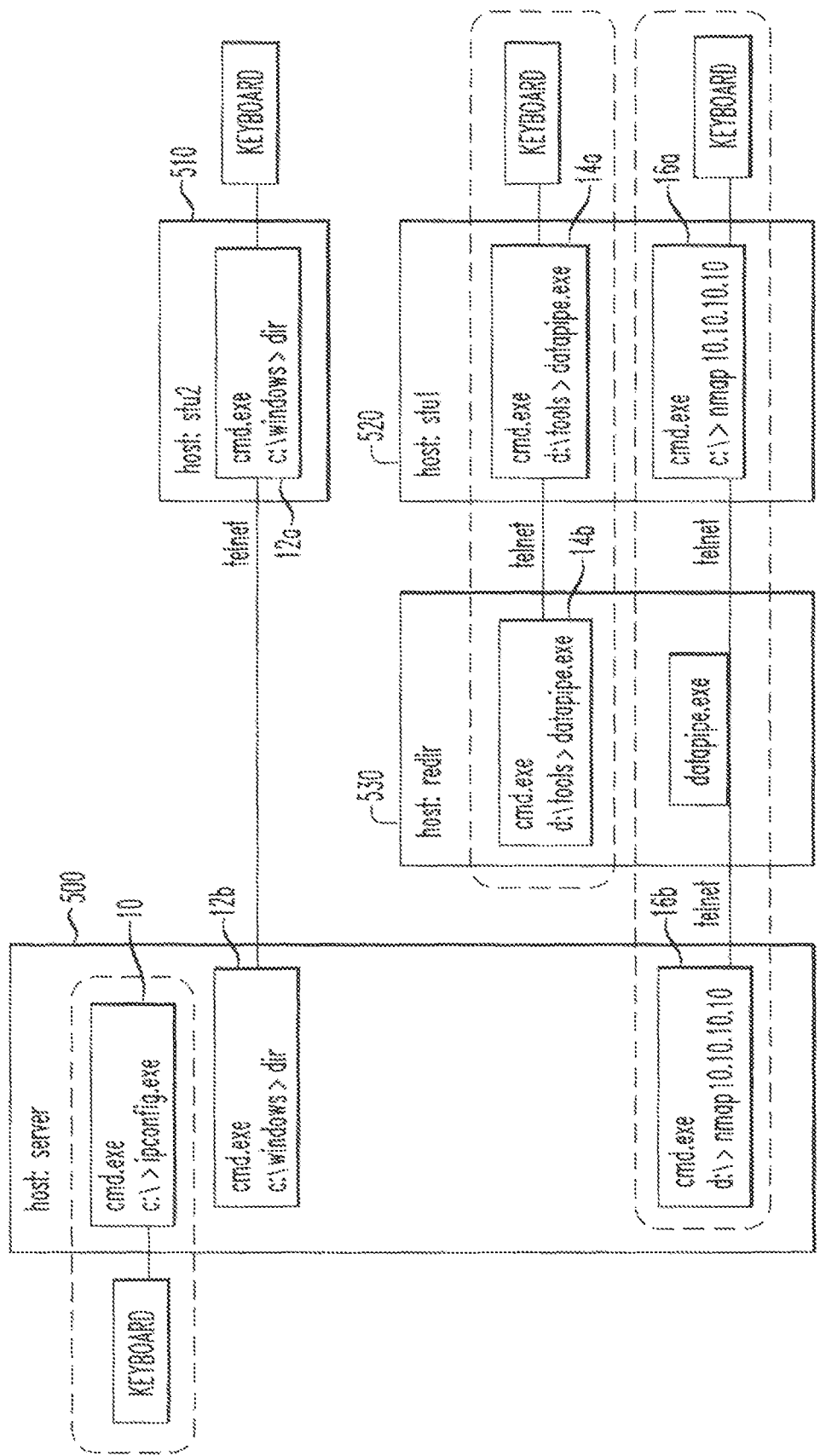
FIG. 6 show an exemplary unauthenticated networked command line activity scenario, in accordance with the principles of the present invention.

FIG. 6 shows an exemplary unauthenticated networked command line activity (CLA) scenario, in accordance with the principles of the present invention.

As shown in FIG. 6, session 1 10 is initiated on server 500 and executed 10 on server 500; session 2 is initiated 12*a* on stu2 510 and executed 12*b* on server 500; session 3 is initiated 14*a* on stu1 520 and executed 14*b* on redir 530; and session 4 is initiated 16*a* on stu1 520 and executed 16*b* on server 500.

Since a keystroke logger (KS) is only able to identify machines on which sessions have been initiated, a keystroke (KS) logger on server 500 would only pick up information about session 1 10 and a keystroke logger (KS) on redir 530 would not pick up any information. Information retrieved by a keystroke logger (KS) on stu1 520 and stu2 510 would include commands initiated on redir 530 and server 500, but would not distinguish that they ran on redir 530 and server 500.

FIG. 7 shows an exemplary single host (windows client), in accordance with the principles of the present invention.

As• portrayed in FIG. 7, by instrumenting a single host 700, the windows client (WC) can retrieve all command line activity (CLA) 710*a*, 710*b*, 710c executed on the host 700. The windows client (WC) monitors all input and output of all instances of cmd.exe 720*a*, 720*b*, 720*c* run on the host 700 to obtain distinct streams of command line activity (CLA) 710*a*, 710*b*, 710*c*. By gathering distinct streams of command line activity (CLA) 710*a*, 710*b*, 710*c*, a windows client (WC) is able to determine which parts of a command line activity (CLA) stream 710*a*, 710*b*, 710*c* are executed locally. For example, if a user SSH-es into another machine and then executes several cat commands remotely, the windows client (WC) can see that the ssh command was executed locally and that the cat commands were executed remotely. The inventive windows client (WC) also monitors process and network states to determine where command line activity (CLA) is initiated and executed.

In accordance with the principles of the present invention, the windows client (WC) monitors process creation and ties command line activity (CLA) streams to process starts on machines in a practical training environment. Streams matched to process starts on a machine are known to be executed on that machine. The windows client (WC) also gathers network information about ancestor processes to determine whether a command line activity (CLA) stream/process start was initiated locally or on a remote host.

In the following exemplary command line activity (CLA) stream, a user SSH-es into remote host, housefire:

D:\>ssh led242@housefire.cryptohaze.com+–new process start on local host
LINUX housefire.cryptohaze.com 2.6.32-41-generic #88-Ubuntu SMP Thu Mar 29 13:10:32 UTC 2012 x86 64 GNU/LINUX
Ubuntu 10.04.4 LTS
Welcome to Ubuntu!
* Documentation: https://help.ubuntu.com/
Run 'do-release-upgrade' to upgrade to it.
Last login: Sun April 21 16:01:09 2013
led242@housefire:-$
led242@housefire:-$
led242@housefire:-$ dir <---executed on housefire, does not create new process on local host
CryptohazeGRT-LINUX-0.55.tar.bz2
cudatoolkit 3.2.16 LINUX 64 ubuntu10.04.run—Desktop
devdriver-3.2-LINUX-64-260.19.26.run
deviceQuery.txt
devices
devices. txt
devices. txt. save
Documents
Downloads
ev
examples.desktop
FileTransfer.dll?Cmd=1
FileTransfer.dll?Cmd=1.1
GetDownloadRequest?brand=TechNet
gmvault
gmvault-db
led242@housefire:-$ cat nohup.out <---executed on housefire, does not create new process on local host
cp: cannot create directory 7media/pigc73/pigb72': Permission denied
cp: cannot create directory 7media/pigc73/pigb72': Permission denied
cp: cannot access 'pigb72/lost+found': Permission denied
led242@housefire:-$ The entire exemplary command line activity (CLA) stream exemplified above is associated with a single ssh command performed on a local host. Dir and cat commands are executed remotely in the command line activity (CLA) stream and do not create new local processes. Thus, dir and cat commands are ignored by the local windows client (WC) monitor process.

On the local host (on which the command line activity (CLA) is initiated) the entire command line activity (CLA) stream is perceived to be single command, 'ssh', executed on the local host.

The following depicts an exemplary command line activity (CLA) stream monitored from remote host, housefire, as a result of the previous command line activity (CLA) stream executed on the local host:

led242@housefire:—$
led242@housefire:—$
led242@housefire:—$ dir , . . . _____ new process start, 'dir' has executed here, collect output
CryptohazeGRT-LI NUX-0.55. tar.bz2
cudatoolkit 3.2.16 LINUX 64 ubuntu10.04.run—Desktop
devdriver 3.2 LINUX 64 260.19.26.run
deviceQuery.txt
devices
devices.txt
devices. txt. save
Documents
Downloads
ev
examples.desktcp
File Transfer.dll?Cmd=1
FileTransfer.dll?Cmd=1.1
GetDownloadRequest?brand=TechNet
gmvault
gmvault-db
led242@housefire:—$ cat nohup.out * new process start, 'cat' has executed here, collect output
cp: cannot create directory 7media/pigc73/pigb72': Permission denied
cp: cannot create directory 7media/pigc73/pigb72': Permission denied
cp: cannot access 'pigb72/lost+found': Permission denied
led242 @ housefire:—$ From the perspective of housefire, the command line activity (CLA) stream includes events dir and cat, which were executed on housefire.

By monitoring processes, the windows client (WC) determines where command line activity (CLA) is executed.

Moreover, to determine where command line activity (CLA) is initiated, a windows client (WC) regularly reports a list of processes, TCP/UDP connections, and new process creations performed on machines in a practical training environment. The windows client (WC) determines where a process is initiated by analyzing ancestor processes associated with the process. If ancestor processes of a process have open network connections that tie the process to a process with an active connection on another machine, then the windows client (WC) concludes the process was initiated on the other machine.

For instance, in the exemplary housefire command line activity (CLA) stream, the scoring server 100 obtains process information for dir on housefire, along with process list and netstat information (TCP/UDP connection info). The server 100 then determines that dir is owned by a /bin/bash process, which is owned by sshd, which has a connection to a windows host. The windows client (WC) monitor process is then checked, which reports that ssh.exe is on the other side of the connection and the parent process is cmd.exe, whose parent process is explorer.exe. So, dir is determined to have initiated from a 'local' windows machine. To attribute remotely-initiated process starts to individual students, this process is traced back over multiple hops to a machine associated with a student.

A priority of the present invention is to make windows client command line activity (CLA) logger activity completely transparent to users/students. The following implementations exemplify approaches for achieving this, all of which involve instrumenting cmd.exe:

1. Redirect standard input/output handles to cmd.exe

This implementation is a modified version of the following msdn example: http://msdn.microsoft.com/enus/library/windows/desktop/ms682499(v=vs.85). aspx In accordance with the principles of the present invention, a new cmd.exe (i.e. a wrapper around the original cmd.exe and executed as a subprocess) can be created and the original cmd.exe can be left on disk with a different name or dropped to disk from the new cmd.exe. One downside of this approach is that both the original cmd.exe and the new cmd.exe wrapper appear in a process list, which may look strange to users/students. Another downside is that the approach does not preserve all cmd.exe behavior transparently, which affects command history functionality.

2. Inject code into cmd.exe to redirect output handles

A dll can be injected into cmd.exe at startup to replace stdout/stderr handles with pipes to the injected code. An advantage of this implementation is that a dll injected into cmd.exe does not show up in a process list. However, an injected dll may show up in a cmd.exe module list (though less visible).

In accordance with the principles of the present invention, an 'appinit_dlls' injection mechanism is used to inject a dll into a cmd.exe. Injection via 'appinit_dlls' is visible (and changeable) in the registry and serves to inject code into many unrelated processes. Code injection may alternatively be implemented via another process that is less apt to stand out.

3. Spy on output handles via driver (no prototype)

A driver can be installed to monitor stdout/stderr handles of all cmd.exe instances or child processes. This implementation is completely transparent and thus much less detectable to users.

Figure 8:
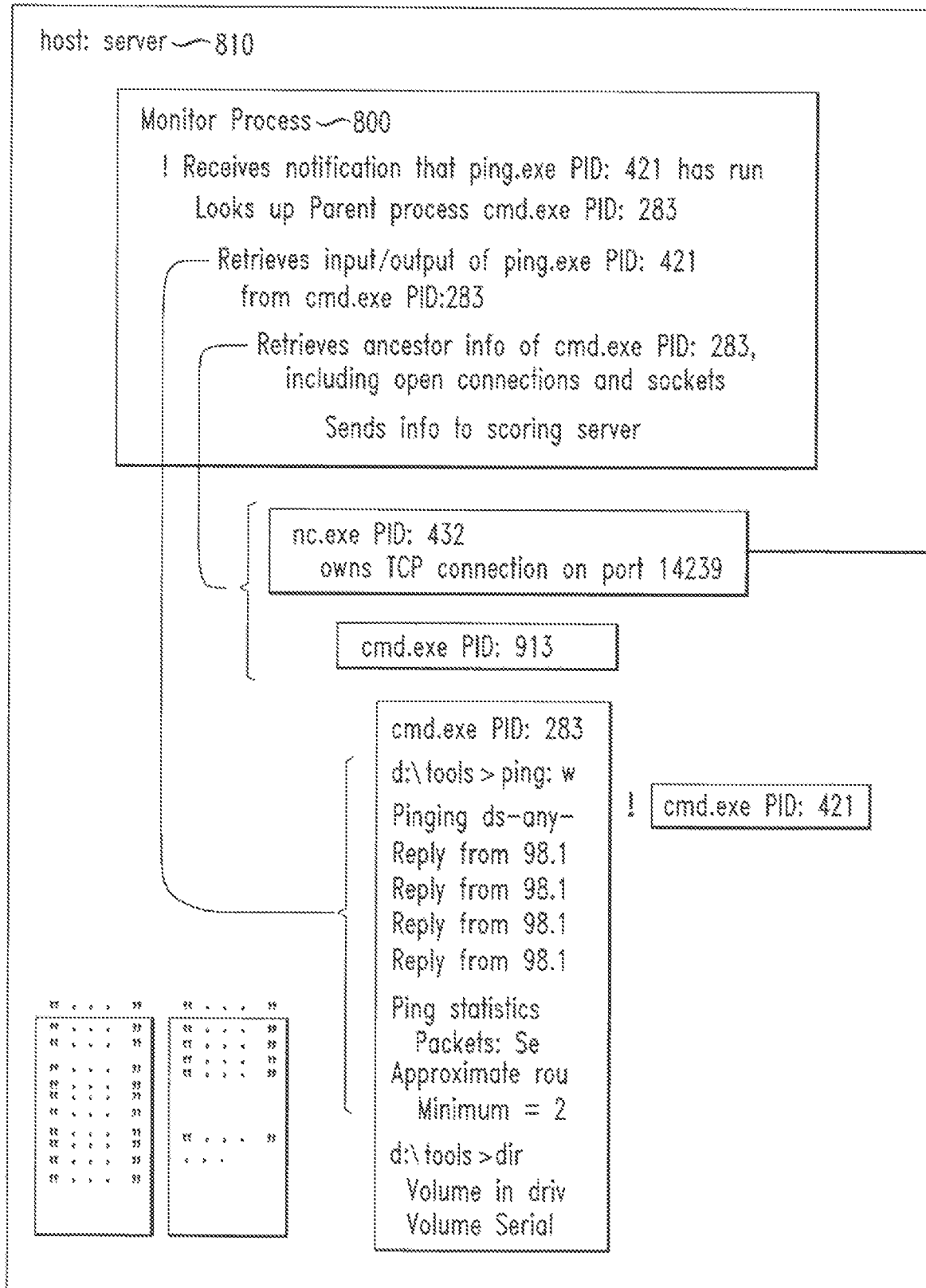
FIG. 8 shows an exemplary windows client (WC) monitor process, in accordance with the principles of the present invention.

FIG. 8 shows an exemplary windows client (WC) monitor process, in accordance with the principles of the present invention.

In accordance with the principles of the present invention, a windows client (WC) monitor process 800 is implemented as a console application running on a client machine 810 during a training exercise, and can be implemented as a service. The windows client (WC) monitor process 800 reports process information, network information, and input/output information every time a new process is started or stopped on a machine 810.

In accordance with the principles of the present invention, process events are handled via a windows management instrumentation (WMI) event listener. However, this approach only works asynchronously and does not work well in Windows 2000 (and previous versions). It is thus possible for process information to disappear before it is processed (a race condition, so far not a real issue in practice). Limitations associated with the windows management instrumentation (WMI) event listener implementation may be solved by implementing process events synchronously with application programming interface (API) hooks or a driver.

In accordance with the principles of the present invention, process and netstat information is reported every time a process terminates. The process and netstat (tcp/udp connection info) information is gathered programatically and does not trigger new process events. Process and netstat information can additionally be reported periodically, or every time a state of network connections changes.

The windows client (WC) command line activity (CLA) logger and windows client (WC) monitor process 800 components communicate via a file system. Each cmd.exe logger writes a command line activity (CLA) stream to file (according to its personal identification device (pid)). When the windows (WC) client monitor process 800 detects that a process has concluded, the monitor process 800 reads/reports/deletes a parent command line activity (CLA) stream file associated with the process (if the parent is cmd.exe). This implementation is not ideal because it allows for alteration by a user. Hence, an alternative method for implementing this (e.g. inter process communication (IPC)) may be employed.

The present invention also preferably hashes process start images. In particular, the inventive scoring server (aka PerformanScore) 100 tracks commands run and processes started on machines used in a practical training environment. However, students in a training course may be asked to rename tools on remote systems to make them look less suspicious. By hashing process start images, the scoring server 100 is able to identify which programs are really being executed.

The scoring server 100 preferably uses SQ Lite in a windows client (WC) and a LINUX client to hash images. More particularly, http://adodotnetsqlite. sourceforge. net or https://system.data.sqlite.org/index.html/doc/trunk/www/index.wiki is preferably used on a windows client (WC).

The inventive scoring server 100 provides training for customers desirous of practical skills assessments and has particular applicability to cyber security and cyber operations training of customers and vendors.

A future embodiment of the present invention includes support for interception of commands implemented through a graphical user interface (GUI). The current implementation does not support interception of commands implemented via a graphical user interface (GUI), but doing so is relatively straight-forward, requiring change to a hook location and the addition of an efficient filtering method (both of which can be done using conventional, known methods). While the invention has been described with reference to the exemplary embodiments thereof, those skilled in the art will be able to make various modifications to the described embodiments of the invention without departing from the true spirit and scope of the invention.

The invention claimed is:

1. A system comprising:
    a non-transitory machine readable medium having machine executable instructions;
    one or more processors that access the machine readable medium and execute the machine readable instructions, the machine readable instructions causing the system to:
        generate command information characterizing a command executed for a cyber training exercise for a scoring server, wherein the generating comprises:
            intercepting, at a pseudoterminal, user input into a primary terminal, the user input characterizing the command;
            sending, from the pseudoterminal, data characterizing the command to an administrative service;
            sending, from the administrative service, data characterizing the command to the scoring server;
            calling, in response to the sending, the command at the pseudoterminal;
            receiving, at the pseudoterminal, response data generated in response to the calling; and
            forwarding, from the pseudoterminal, the response data to the administrative service and the primary terminal.

2. The system of claim 1, wherein the administrative service sends the response data to the scoring server in response to receiving, from the pseudoterminal, data characterizing another command.

3. The system of claim 1, wherein the pseudoterminal forwards the response data to the administrative service prior to forwarding the response data to the primary terminal.

4. The system of claim 3, wherein the primary terminal outputs a response characterizing the response data in response to receiving the response data from the pseudoterminal.

5. The system of claim 4, wherein the primary terminal outputs a response characterizing the response data prior to the administrative service sending the response data to the scoring server.

6. The system of claim 1, wherein the pseudoterminal operates on a computer device that has been assigned a given Internet Protocol (IP) address and the command is called on a computer device that has been assigned another IP address.

7. A method comprising:
intercepting, at a pseudoterminal of a computing device, user input into a primary terminal of the computing device, the user input characterizing a command requested for a cyber training exercise in a network;
sending, from the pseudoterminal, data characterizing the command to an administrative service;
sending, from the administrative service executing on the computing device, data characterizing the command to a scoring server;
calling, in response to the sending, the command at the pseudoterminal;
receiving, at the pseudoterminal, response data generated in response to the calling; and
forwarding, from the pseudoterminal, the response data to the administrative service and the primary terminal.

8. The method of claim 7, further comprising:
sending, from the administrative service, the response data to the scoring server in response to receiving, from the pseudoterminal, data characterizing another command.

9. The method of claim 8, further comprising:
outputting, at the primary terminal, a response characterizing the response data.

10. The method of claim 9, wherein the outputting is executed prior to the administrative service sending the response data to the scoring server.

11. The method of claim 7, wherein the calling initiates a process on an external computing device.

12. The method of claim 7, further comprising:
evaluating, at the scoring server, the cyber training exercise for a given student associated with the primary terminal based at least in part on the command sent from the administrative service;
comparing, at the received command to training performance objectives for the cyber training exercise; and
generating a score assessing a performance of the given student for the cyber training exercise based on the comparing.

13. The method of claim 12, further comprising:
associating the given student with the command based on matching an Internet Protocol (IP) address of the computing device executing the primary terminal and an IP address associated with the command called by the pseudoterminal.

* * * * *